United States Patent [19]

Hsu

[11] Patent Number: 5,178,458
[45] Date of Patent: Jan. 12, 1993

[54] EXTRUDER SCREW MIXING HEAD

[75] Inventor: John S. Hsu, Cincinnati, Ohio

[73] Assignee: Cincinnati Milacron Inc., Cincinnati, Ohio

[21] Appl. No.: 666,706

[22] Filed: Mar. 8, 1991

[51] Int. Cl.⁵ .................. B29B 07/42; B29F 07/02
[52] U.S. Cl. .................................... 366/89; 366/90
[58] Field of Search ............... 366/79, 88, 90, 80, 366/81, 83, 89, 318, 319, 323, 324; 425/208, 209, 207

[56] References Cited

U.S. PATENT DOCUMENTS

| | | | |
|---|---|---|---|
| 2,680,879 | 6/1954 | Schnuck | 366/88 |
| 2,989,778 | 6/1961 | Frenkel | 18/14 |
| 3,006,029 | 10/1961 | Saxton | 366/90 |
| 3,421,182 | 1/1969 | Colombo | 18/12 |
| 3,427,003 | 2/1969 | Schneider et al. | 259/9 |
| 3,486,194 | 12/1969 | Parks | 18/12 |
| 3,524,222 | 8/1970 | Gregory et al. | 18/12 |
| 3,902,850 | 9/1975 | Lehnert | 23/252 |
| 3,941,535 | 3/1976 | Street | 425/208 |
| 3,989,434 | 11/1976 | Mercer | 425/207 |
| 4,134,688 | 1/1979 | Horie et al. | 366/81 |
| 4,136,969 | 1/1979 | Meyer | 366/88 |
| 4,171,196 | 10/1979 | Maillefer | 366/81 |
| 4,184,772 | 1/1980 | Meyer | 366/77 |
| 4,695,165 | 9/1987 | Fukumizu et al. | 366/90 |
| 4,733,970 | 3/1988 | Yokana | 366/79 |
| 4,779,989 | 10/1988 | Barr | 366/90 |
| 4,981,364 | 1/1991 | Geyer | 366/81 |
| 5,000,900 | 3/1991 | Baumgartner | 366/81 |

FOREIGN PATENT DOCUMENTS

| | | | |
|---|---|---|---|
| 1000215 | 1/1957 | Fed. Rep. of Germany | 425/208 |
| 1271973 | 7/1968 | Fed. Rep. of Germany | 425/208 |
| 3200256 | 7/1983 | Fed. Rep. of Germany | 425/208 |
| 0014959 | 7/1974 | Japan | 425/208 |
| 0047819 | 12/1978 | Japan | 425/208 |
| 0028868 | 2/1980 | Japan | 425/208 |
| 0184047 | 5/1963 | Sweden | 366/90 |

OTHER PUBLICATIONS

*Polymer Extruders*, by Chris Rauwendaal, published by Hanser Publishers, 1986, Figures 8-80 to 8-85.

Primary Examiner—Harvey C. Hornsby
Assistant Examiner—Tony G. Soohoo
Attorney, Agent, or Firm—Nies, Kurz, Bergert & Tamburro

[57] ABSTRACT

An extruder screw mixing head that is adapted to be carried by an extruder screw at a downstream portion of the screw for improved distributive mixing. The mixing head includes a central body that tapers and diverges in a downstream direction to provide a progressively diminishing flow channel in an axial direction of the mixing head. Four equally spaced flights of equal pitch are provided on the outer periphery of the mixing head, and each flight has a series of peripheral recesses that are spaced from each other along the flights and that permit flow of plasticated material between adjacent flow channels defined by the spaced flights to improve homogeneity of the material. The recesses are so configured that their respective leading and trailing edges are aligned to define circumferential angles with the longitudinal axis of the mixing head, so that the inter-channel flow areas of the recesses increase in a direction toward the outlet of the extruder barrel. The taper of the center portion of the mixing head causes a reduction in the flow areas of the channels in a downstream direction, which encourages inter-channel flow to thereby promote improved mixing of the material being conveyed by the extruder screw.

19 Claims, 2 Drawing Sheets

EXTRUDER SCREW MIXING HEAD

BACKGROUND OF THE INVENTION

1. Field of the Invention

The present invention relates to a mixing head adapted to be connected with and to form part of an extruder plastication screw. More particularly, the present invention relates to a mixing head that includes a plurality of external spiral channels defined by a plurality of spaced helical flights, the flights each having peripherally positioned undercuts defining flow passageways between the respective spiral channels to enable improved mixing of the plasticated material to occur in order to provide improved homogeneity of the extruded material that leaves the extruder.

2. Description of the Related Art

Extruder plastication screws typically contain one or more radially outwardly extending helical flights that define one or more helical flow channels between the respective flights. As polymeric material in either powdered or pelletized form is introduced into a material inlet provided in the extruder barrel within which the screw is rotatably carried, the solid material is gradually carried along the screw from the material inlet to the material outlet. While the material is being conveyed along the screw it is heated in order to soften it to permit it to be extruded through a suitable extrusion die positioned at or adjacent to the outlet of the extruder barrel. Heating of the material is accomplished by external heat sources positioned on the outer surface of the barrel, such as by means of a series of annular electrical resistance heating elements, and also by internal heating of the material by virtue of mechanical working of the material as it progressively moves along the extruder screw.

Frequently, additives such as colorants, anti-static compounds, and the like, are added to the polymeric material to provide desired properties and appearance. Such additives must be intimately intermixed with the polymeric material before the material exits from the extruder.

Over the years, many different types of extruder screw flight configurations and screw constructions have been proposed for improved mixing of the material to be extruded. For example, in U.S. Pat. No. 3,427,003, which issued on Feb. 11, 1969, to R. Schneider et al., there is disclosed a mixing head having a generally cylindrical body that carries a set of inner helical flights of one hand, and a set of outer flights surrounding the inner flights but of the opposite hand. The Schneider et al. construction provides a plurality of helices, defined by the respective inner and outer flights, the helices communicating with each other and serving to provide greater mixing of the material being extruded as the material is conveyed along the mixing head.

In U.S. Pat. No. 3,486,194, which issued Dec. 30, 1969, to C. E. Parks, there is shown and described a plastics extruder screw that incorporates a mixing head in the form of an elongated torpedo at its forward or discharge end. The torpedo includes a plurality of longitudinally staggered, circumferentially spaced, radially extending flight segments that can either be positioned so that they are aligned in a longitudinal direction or alternate rows of flight segments can be inclined relative to each other.

In U.S. Pat. No. 4,779,989, which issued Oct. 25, 1988, to Robert A. Barr, there is disclosed a plastics extruder screw having a mixing head or element at its downstream end. The mixing head includes a plurality of interrupted helical grooves, and the adjacent portion of the surrounding barrel includes a plurality of recessed helical grooves of opposite hand to the grooves in the mixing head. The disclosed structure provides a plurality of individual recessed cavities, some of which are formed in the surface of the barrel and others of which are formed in the surface of the mixing head, to permit transfer of the plasticated material between the respective cavities as the material is being conveyed, to thereby improve the homogeneity of the extruded material.

In U.S. Pat. No. 3,941,535, which issued Mar. 2, 1976, to Louis F. Street, there is shown an extruder plastication screw having an intermediate mixing section that includes a plurality of helical flights, each of the flights having a plurality of peripheral slots spaced from each other along their respective flights. The slots each extend across the respective flights in a direction that is substantially perpendicular to the longitudinal axis of the screw, and the slots progressively increase in depth in the direction toward the discharge end of the screw. Again, the passageways defined by the slots are intended to permit flew of plasticated material to take place between adjacent channels, and thereby promote mixing of the material being extruded.

Although the prior art devices serve to promote some degree of improved mixing, as compared with a conventional screw not having such mixing-promoting devices, a number of the structures proposed in the prior art are difficult to manufacture, and therefore are of high cost. Additionally, some of the proposed approaches impose substantial shearing forces on the plasticated material, which can cause excessive and undesired localized heating of the material, possibly causing degradation of the material.

It is an object of the present invention to overcome the deficiencies of the prior art structures, and to provide an improved extruder mixing head that is effective to promote mixing of the plasticated material for improved homogeneity, and at the same time one that is of relatively simple structure, and is therefore economical to produce.

SUMMARY OF THE INVENTION

Briefly stated, in accordance with one aspect of the present invention, a mixing device is provided for use with a plastication screw that is rotatably carried within a tubular extruder barrel. The main portion of the screw can have one or more helical flights of constant or varying pitch and the flights can define therebetween helical channels of uniform or varying depth.

The mixing device is carried by the plastication screw at a position near the barrel outlet, and it includes at least one helical flight that extends radially outwardly of an inner body member in a helical direction to define a flow channel for conveying plasticated material along the plastication screw toward the extruder barrel outlet. The helical flight has a constant outer diameter defining planar flight outer peripheries that are parallel with the screw longitudinal axis and are substantially in full contact with the inner surface of the barrel.

The mixing device flight includes at least one group of recesses formed in the peripheral outer surface of the flight, the respective recesses extending across the flight to provide flow paths between portions of the flow channel that are spaced from each other by the flight. The recesses in a group are aligned in the direction of the longitudinal axis of the mixing device to permit flow of plasticated material through the recesses and over the flight and between adjacent portions of the flow channel to promote intimate mixing of the plasticated material as it passes through the mixing device.

In a preferred form of the invention, the flow channel defined by the mixer flight gradually decreases in radial depth in a direction toward the extruder barrel outlet.

In a further preferred form of the invention, the recesses in the flight peripheries are so configured that they have a progressively greater length, taken along the direction of the flights, in the direction toward the extruder barrel outlet, so that as the flow channel depth decreases the flight recesses increase in length and area to provide increased inter-channel flow of the plasticated material.

DESCRIPTION OF THE PREFERRED EMBODIMENTS

Figure 1:
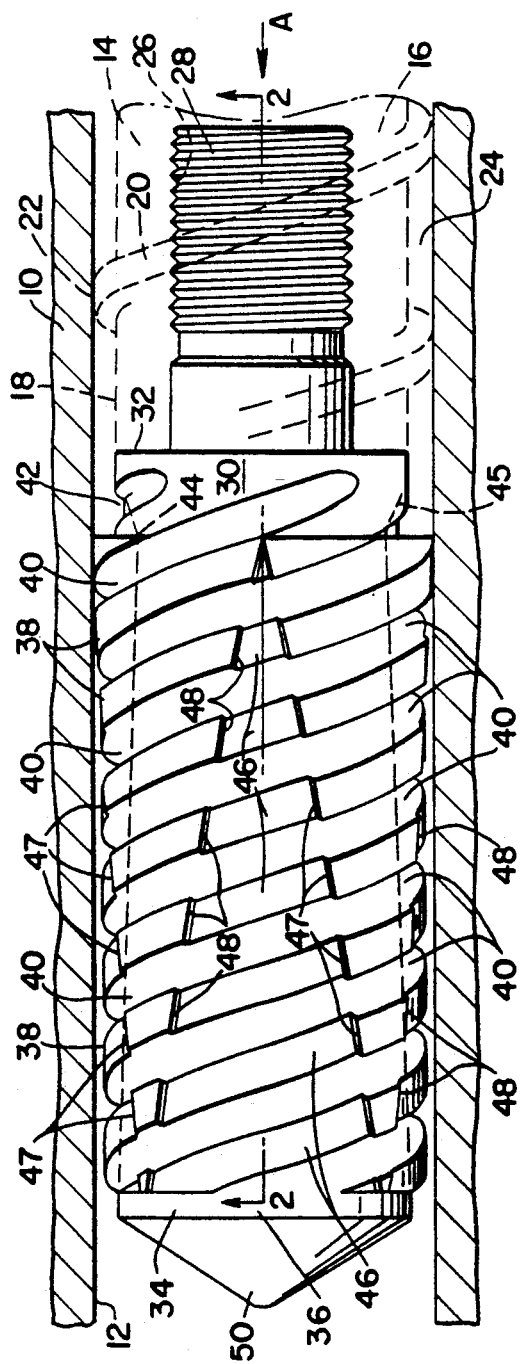
FIG. 1 is a fragmentary side elevational view, partially in section, showing a mixing head in accordance with the present invention connected with a conventional extruder screw and positioned within an extruder barrel.
Figure 2:
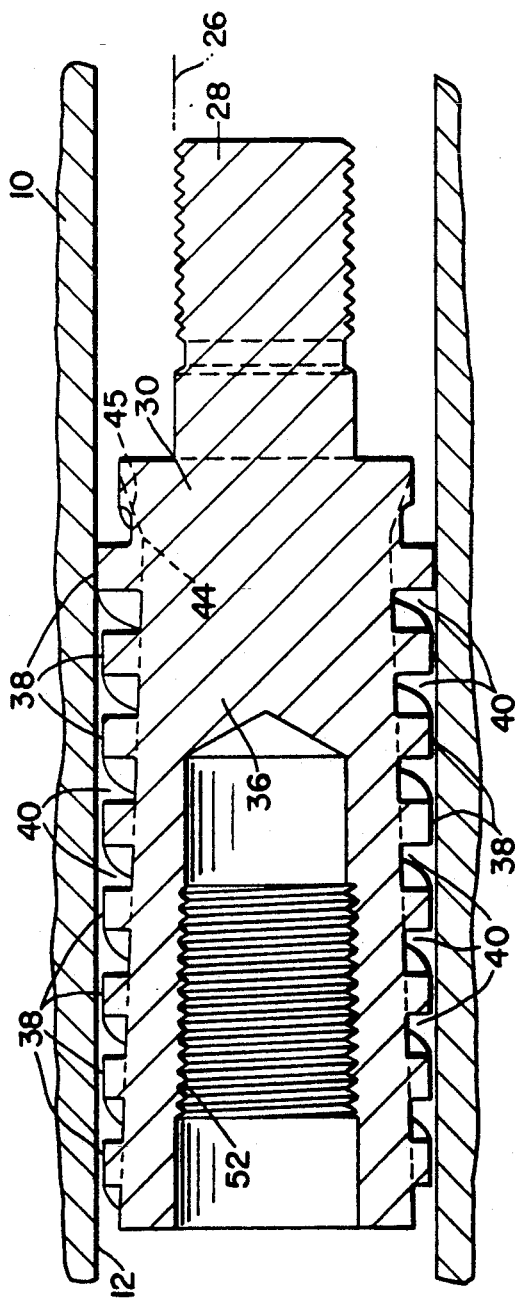
FIG. 2 is a longitudinal cross-sectional view of the mixing head shown in FIG. 1, taken along the line 2—2 thereof.
Figure 4:
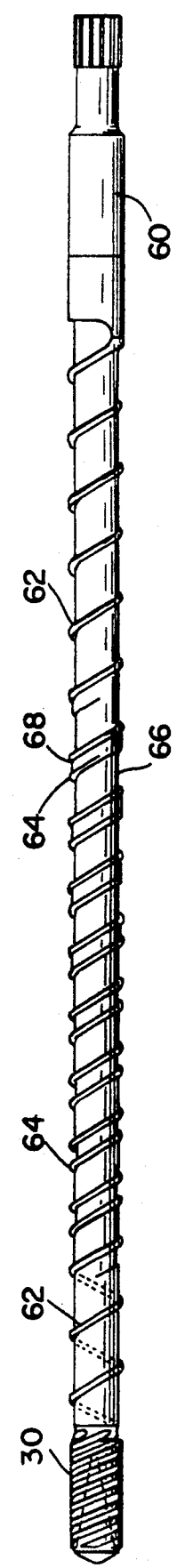
FIG. 4 is a side view of a barrier-type plastication screw including a mixing head in accordance with the present invention.

Referring now to the drawings, and particularly to FIG. 1 thereof, there is shown a fragmentary portion of an extruder barrel 10 that is of generally tubular configuration, and that includes a cylindrical inner barrel surface 12. Positioned within barrel 10 is a rotatable plastication screw 14 that includes a central body 16 of generally circular cross-section. Typically, and as shown in FIGS. 1, 2, and 4, central body 16 tapers in an axial direction from a relatively smaller diameter at the point where incoming solid or particulate material is introduced into barrel 10 to a relatively larger diameter at the downstream or forwardmost end 18 of screw 14. The outer surface of central body 16 carries one or more radially outwardly extending helical flights 20 that have outer flight surfaces 22 that contact inner barrel surface 12. The spaces between adjacent screw flights 20 define flow channels 24 to receive and convey the material being plasticated as it is transported by screw 14 in a generally axial direction within barrel 10 and toward the barrel outlet (not shown), which is from right to left as viewed in FIG. 1.

In practice, extruder barrel 10 carries externally positioned heating means (not shown), such as resistance heater bands, coils defining circulating fluid passageways for circulating heated fluids, and the like. The external heating means provide a source of heat to raise the temperature at inner barrel surface 12 so that heat is transferred to the polymeric material, to thereby raise its temperature and to cause it to soften and become more fluid it as it contacts and passes along barrel inner surface 12.

Downstream of forwardmost end 18, screw 14 includes a centrally positioned blind bore 26 that is internally threaded to threadedly receive a corresponding externally threaded stub end 28 of a generally cylindrical mixing head 30. As is apparent from FIG. 1, mixing head 30 has a radially outwardly extending shoulder 32 that is adapted to engage with forwardmost end 18 of extruder screw 14, so that forward end 34 of mixing head 30 faces the extruder outlet (not shown).

Mixing head 30 includes a center body portion 36 that is of substantially circular cross-section and that tapers and diverges outwardly toward inner barrel surface 12 in the direction from extruder screw 14 toward forward end 34. Preferably, the outer diameter of shoulder 32 is equal to the outer diameter of screw 14 at forwardmost end 18 to avoid an abrupt transition, and to provide a smooth flow channel for the softened polymeric material.

Carried on the outer surface of central body portion 36 are four helical, radially outwardly extending flights 38 that have starts that are equidistantly spaced about the periphery of center body portion 36 to define four independent, similarly configured helical flow channels 40 between respective ones of the flights. Fights 38 each have the same pitch, so that each of channels 40 have the same axial width throughout the longitudinal extent of mixing head 30. Typically, and as is apparent in FIG. 1, the pitch of flights 38 is less than the pitch of flights 20 on extruder screw 14.

Referring now to FIG. 2, it can be seen that in longitudinal cross section flights 38 are rectangular. Although the width of each of the respective channels 40 defined by adjacent flights 38 remains constant along the entire length of the channels, the cross-sectional flow areas of each of channels 40 diminishes because the spacing between the outer surface of center body portion 36 and barrel inner surface 12 diminishes in the downstream direction, from extruder screw 14 toward forward end 34.

Figure 3:
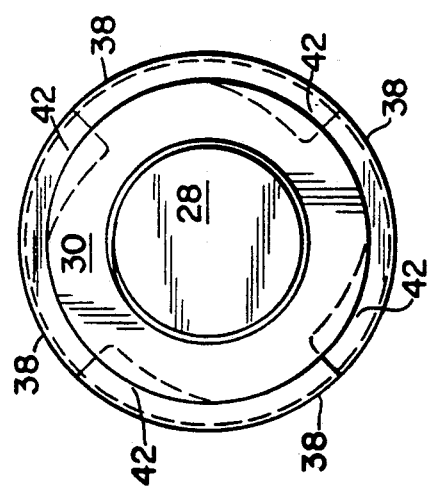
FIG. 3 is an end view of the mixer head shown in FIG. 1, viewed in the direction of arrow A of FIG. 1.

A best seen in FIG. 3, the entry areas 42 of the respective channels 40 in mixing head 30 are equidistantly spaced about the periphery of mixing head 30.

Referring once again to FIG. 1, central body portion 36 of mixing head 30 tapers inwardly in a direction from forward end 34 toward extruder screw 14 (from left to right as viewed in FIG. 1) to a point 44 adjacent to the entry areas 42 of flow channels 40. At point 44 the inner diameter of each of channels 40 is less than the outer diameter of annular shoulder 32 of inner body 16. From point 44 rearward toward annular shoulder 32 the inner diameter of each of channels 40 gradually increases to meet the outer surface of screw inner body 16 adjacent annular shoulder 32. Point 44 is also the point at which flights 38 commence. Thus, between the flight commencement position at point 44 and the forwardmost end 18 of extruder screw 14 there is a relatively short transition portion 45 of mixing head 30 in which shallow helical channels are provided, but in which no flights exist that are in contact with barrel inner wall 12.

The outermost surfaces of flights 38 of mixing head 30 are substantially planar, and the diameters of the respective flights 38 are substantially equal to the inner diameter o inner barrel surface 12 to provide closed channels 40 to confine the movement of the plasticated material to the areas defined by channels 40 between the respective flights 38.

As best seen in FIG. 1, the radially outermost surfaces of each of flights 38 include a plurality of recesses 46 that extend along portions of the respective flights 38 and that have a depth defined by reduced diameter portions of the respective flights to form generally arc-shaped passageways that provide communication across a flight and between adjacent channels 40. The respective recesses in a given flight are spaced from each other along the flight, and the lengths of the recesses on each flight progressively increase in the helical direction of the flights toward forwardmost end 34 of mixing head 30.

As is also shown in FIG. 1, recesses 46 each include linear leading edges or undercuts 47 and linear trailing edges or undercuts 48 that together define the arc length of the respective recesses. Undercuts 47 and 48 diverge outwardly relative to the longitudinal axis of mixing head 30, and corresponding leading edges 47 and trailing edges 48 of groups of recesses 46 in adjacent flights 38 are aligned and lie along lines that define therebetween an included angle of about 25°. Consequently, the respective aligned recesses 46 define interchannel flow paths having progressively increasing flow areas as one proceeds along mixing head 30 in a direction from shoulder 32 toward forward end 34. In the embodiment illustrated, four such circumferentially spaced groups of recesses 46 are provided in the flights, at equally spaced intervals around the periphery of mixing head 30.

Recesses 46 each have a substantially uniform and constant depth around the respective flights, and leading edges 47 and trailing edges 48 of the respective recesses ar preferably perpendicular to the outer periphery of flights 38 and also perpendicular to the inner surfaces of the recesses. Additionally, the portions of each flight between adjacent recesses are adapted to be in substantial contact with inner barrel surface 12, and they have a constant outer diameter along the entire length of the mixing head. The gaps between the bottom or innermost surfaces of the respective recesses and the inner surface of the barrel is clearly evident in each of FIGS. 1 and 2.

Forwardmost end 34 of mixing head 30 can include a generally conical screw tip 50, which can be threadedly received within a blind bore 52 (see FIG. 2). If desired, a further mixing or metering section can be threadedly attached to forwardmost end 34 of mixing head 30, to thereby position mixing head 30 at an intermediate position on plastication screw 14. Further, the mixing head 30 in accordance with the present invention can be provided as a part of a plastication screw for an injection molding machine, and when so employed blind bore 52 can receive the threaded stub end of an anti-backflow valve, which, for example, can be of a sliding annular ring type familiar to those skilled in the art.

In addition to application of the mixing head of the present invention to a conventional extruder screw having one or more flights of uniform outer diameter, mixing head 30 can also be used with a barrier-type extruder screw 60 of the type illustrated in FIG. 4. As shown, screw 60 includes a first flight 62, which is of constant pitch and outer diameter along the entire length of screw 60. A second flight 64 is provided and is positioned downstream of first flight 62 to define with first flight 62 a solids channel 66 and a molten material channel 68. Second flight 64 begins at an intermediate portion of the screw, preferably at a point where the polymeric material begins to melt, and it has a slightly smaller outer diameter than first flight 62 to permit molten material to flow rearwardly across second flight 64 from solids channel 66 to molten material channel 68. The outer diameter of second flight 64 is less than that of first flight 62 by about 1/16 inch or so. The combination of a mixing head in accordance with the present invention with a barrier-type screw has been found to provide especially good intermixing o colorants in the molten material, particularly when the molten material is a basically crystalline material and is in a molten, flowable state.

In operation, as the polymeric material is softened and plasticated while it is carried by extruder screw 14 from the material inlet toward the outlet of extruder barrel 10, the material enters channels 40 in mixing head 30 and is further conveyed longitudinally within the mixing head, along channels 40 toward screw tip 50. As the material moves along channels 40, because of the diminishing radial depth of channels 40 as the material progresses toward the extruder barrel outlet, the flow area within the channels between adjacent flights gradually diminishes, which causes pressure buildup within the material, as a result of which a portion of the material passes through the recesses that extend between adjacent flow channels to intermix with the material already in those channels. Thus, as the material is conveyed toward the extruder barrel outlet it continuously intermixes with material in adjacent flow channels in the mixing head, to permit cross-channel mixing to occur and thereby improve the homogeneity of the plasticated material as it issues from the extruder outlet.

Additionally, because only segments of the respective flights have been reduced in size to define the recesses, the upstream edges 47 of the respective recesses 46 act like stirring elements to provide additional distributive mixing of the plasticated material. As the material is conveyed toward the extruder barrel outlet, inner surface 12 of barrel 10 is continuously wiped by the flights, thereby minimizing prolonged contact of the slowly moving layer of plasticated material with the heated barrel inner wall.

At the outlet end of the mixing head the material from the several channels flows together once again and has been sufficiently intermixed to permit flow through the extruder barrel outlet for extrusion through a die to provide extruded shapes of predetermined configuration.

Although the mixing head in accordance with the present invention has been illustrated and described as a separate element that is threadedly connected with an extruder screw, in its preferred form for use in a plastics extruder the mixing head is formed integrally with the body of the screw. Further, the disclosure of the present invention for use in an extruder for the extrusion of plastics materials is illustrative only, and the invention can also be used as a part of a plastication screw employed in an injection molding machine, as well as to other types of mixing devices for mixing viscous fluid materials having a broad range of viscosities.

It can thus be seen that the present invention provides a simple construction that is relatively easy to manufacture to provide improved mixing in an extruder screw, and to ensure greater homogeneity of the resulting extruded product.

Although particular embodiments of the present invention have been illustrated and described, it will be apparent to those skilled in the art that various changes and modifications can be made without departing from the spirit of the present invention. It is therefore intended to encompass in the appended claims all such changes and modifications that fall within the scope of the present invention.

What is claimed is:

1. A mixing device adapted for use on a plastication screw for mixing and conveying plasticated material, said mixing device comprising:
   a) a body member having a longitudinal axis and a circular cross section and tapering from a smaller diameter at a first, material inlet end to a larger diameter at a second, material output end spaced from the first end;
   b) at least one helical flight extending radially outwardly from the body member in a helical direction to define a helical flow channel, the flight having a peripheral outer surface of uniform radial dimension relative to the longitudinal axis of the body member; and
   c) at least one group of recesses formed in the peripheral outer surface of the flight, the respective recesses extending across the flight to provide flow paths between longitudinally spaced portions of the helical flow channel defined by the flight, wherein each of the recesses in a group has a centerline and the centerlines of the recesses in a group are aligned with each other in the direction of the longitudinal axis of the body member to define a single continuous line and to permit flow of plasticated material through the recesses and over the flight and between adjacent portions of the flow channel to promote intimate mixing of the plasticated material as it passes through the mixing device, and wherein the flow paths defined by the recesses progressively increase in flow area in a direction from the material inlet end of the body member toward the material outlet end thereof.

2. A mixing device in accordance with claim 1 wherein the recesses define arc-shaped passageways interconnecting portions of the flow channel separated from each other by the flight.

3. A mixing device in accordance with claim 2 wherein the lengths along the helical direction of the flight of the arc-shaped recesses are greater for recesses that are closer to the second end of the body member.

4. A mixing device in accordance with claim 1 including a plurality of circumferentially spaced groups of recesses, wherein the recesses in each group are substantially aligned in the direction of the longitudinal axis of the mixing head.

5. A mixing device in accordance with claim 4 wherein the groups of recesses are substantially equally circumferentially spaced from each other along the helical direction of the flight.

6. A mixing device in accordance with claim 1 wherein the recesses include edges that extend across the flight and are spaced from each other along the helical direction of the flight, and the edges of each recess are positioned in diverging relationship relative to each other to diverge in a direction from the first end to the second end of the body member.

7. A mixing device in accordance with claim 6 wherein the edges of the recesses define an included angle of about 25°.

8. A mixing device in accordance with claim 1 wherein aligned recesses have corresponding first and second edges that extend across respective flights and the first edges of the recesses are aligned with each other and the second edges of the recesses are aligned with each other.

9. A mixing device in accordance with claim 8 wherein at least one of the aligned first edges and the aligned second edges of the recesses is inclined circumferentially relative to the mixing head longitudinal axis.

10. A mixing device in accordance with claim 6 wherein the diverging edges define an included angle of about 25°.

11. A mixing device in accordance with claim 1 wherein the recesses each ave a radial depth and the radial depths of each of the recesses is less than the radial height of the flight.

12. A mixing device in accordance with claim 11 wherein the recesses each have a uniform radial depth relative to an outer diameter of the flight.

13. A mixing device in accordance with claim 1 wherein the mixing head includes four peripheral flights and four independent flow channels.

14. A mixing device in accordance with claim 13 wherein four groups of recesses are provided, and each of the groups of recesses is equally circumferentially spaced around the periphery of the mixing head from an adjacent group of recesses.

15. Apparatus for plasticating polymeric material, said apparatus comprising:
   a. a tubular barrel having a barrel outlet at one end and a barrel inlet spaced along the barrel from the barrel outlet;
   b. a plastication screw rotatably carried within the barrel, the screw having a longitudinal axis and at least one peripheral helical plastication flight for conveying material along the screw longitudinal axis from the material inlet of the barrel to the material outlet of the barrel; and
   c. a mixing device carried by the plastication screw, the mixing device including a tapered body member having at least one continuous helical mixing flight defining a helical mixing flow channel for conveying plasticated material from the plastication flight toward the barrel outlet, the helical mixing flight having a constant outer diameter defining a flight periphery aligned with the screw longitudinal axis and in contact with the barrel inner surface, and at least one group of recesses formed in the peripheral outer surface of the flight, the respective recesses extending across the flight to provide flow paths between longitudinally spaced portions of the helical flow channel defined by the flight, wherein the recesses in a group are aligned in the direction of the longitudinal axis of the screw to permit flow of plasticated material through the recesses and over the flight and between adjacent portions of the flow channel to promote intimate mixing of the plasticated material as it is conveyed toward the barrel outlet, and wherein the flow paths defined by the recesses progressively increase in flow area in a direction from the material inlet end of the body member toward the material outlet end thereof.

16. Apparatus in accordance with claim 15 wherein the mixing device is removably carried by the screw.

17. Apparatus in accordance with claim 16 wherein the mixing device includes a threaded stub end, and the plastication screw includes a threaded blind bore adapted to receive the threaded end of the mixing head.

18. Apparatus in accordance with claim 16 wherein the mixing device includes a threaded blind bore, facing the barrel outlet for receiving a threaded screw tip member.

19. Apparatus in accordance with claim 15 wherein the screw is a barrier screw having a solids channel and a molten material channel separated by a helical flight having an outer surface spaced from the inner surface of the extruder barrel to permit flow of molten material thereover.

* * * * *